US008708018B2

(12) United States Patent
Boulay et al.

(10) Patent No.: US 8,708,018 B2
(45) Date of Patent: Apr. 29, 2014

(54) ARRANGEMENTS AND METHODS FOR APPLYING A LABEL TO A MOVING OBJECT (75) Inventors: Andrew E. Boulay, Fort Pierce, FL (US); Edgar L. Shepherd, Vero Beach, FL (US); Steven Todd Hampson, Vero Beach, FL (US); Stephen Barrett Morris, Sebastian, FL (US); James Joseph Glaser, Fort Pierce, FL (US); Donald Ray Tinsley, Port St. Lucie, FL (US); Stephen J. Selzer, Vero Beach, FL (US)

(73) Assignee: Booth Manufactruring Company, Ft. Pierce, FL (US)

( * ) Notice: Subject to any disclaimer, the term of this patent is extended or adjusted under 35 U.S.C. 154(b) by 0 days.

(21) Appl. No.: 13/461,529

(22) Filed: May 1, 2012

(65) Prior Publication Data
US 2013/0292042 A1   Nov. 7, 2013

(51) Int. Cl.
*B65C 3/02* (2006.01)
*B65C 9/36* (2006.01)
*B65C 9/18* (2006.01)
*B29C 53/56* (2006.01)

(52) U.S. Cl.
CPC ... *B65C 3/02* (2013.01); *B65C 9/36* (2013.01); *B65C 9/1884* (2013.01); *B29C 53/562* (2013.01)
USPC .......................................... 156/481; 156/486

(58) Field of Classification Search
CPC .......... B65C 3/00; B65C 9/36; B65C 9/1884; B29C 53/562
USPC .............................. 156/475, 477.1, 481, 486
See application file for complete search history.

(56) References Cited

U.S. PATENT DOCUMENTS

| 4,961,815 A * | 10/1990 | Buckley et al. ............... 156/486 |
| 7,954,530 B1 | 6/2011 | Bennett et al. |
| 2009/0001707 A1 * | 1/2009 | Brooks ......................... 156/538 |

\* cited by examiner

*Primary Examiner* — Christopher Schatz
*Assistant Examiner* — John Blades
(74) *Attorney, Agent, or Firm* — Dentons US LLP (57) ABSTRACT The present application describes an arrangement for applying a label to the periphery of a moving object. The arrangement may include an initial label dispensing an application station, a label tacking station, and a label wrapping station. Associated methods are also described.

17 Claims, 12 Drawing Sheets

ND METHODS FOR
APPLYING A LABEL TO A MOVING OBJECT

FIELD

The present disclosure relates to arrangements and methods constructed and performed in a manner so as to facilitate securing a label about the outer periphery of a moving object in a reliable, economical, and repeatable manner.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Current technologies for applying labeling to a moving object typically suffer from certain drawbacks. For example, one such form of labeling involves application of ink or dye directly to the surface of the moving object. This technique can permanently mark the object such that if it becomes necessary or desirable at a later point in time to change the information applied to the object, it is often times impossible to do so. Moreover, use of such inks or dyes can be prone to smudging thus making them difficult to read on the finished product. In addition, the ink or dye may be many different shades or colors resulting in multiple nozzles to distribute the ink, thus causing increased expense and change over time during production. Therefore, for certain applications in which time and expense are brought to the forefront for properly marking various products; pre-printed labels can be the preferred choice.

One particular application of this type of labeling occurs in the production of cables or conduits. It is desirable to apply labeling to the outer periphery of cables or conduits while they are moving. U.S. Pat. No. 7,954,530 describes a method and apparatus for applying labels to cable or conduit. Throughout the process described in U.S. Pat. No. 7,954,530 the label is first tamped onto the cable and then wiped onto the cable using a series of rollers and shoes. These rollers and shoes are pressing the label onto the cable using aligning tools and springs. During this wipe down process the label has a tendency to skew from one end of the label to the other end. The label also has a tendency to both wrinkle and move on the cable before it is heated and shrink-wrapped. Thus, there is room for improvement relative to the method and apparatus described therein. Thus, there is a need in the art for effectively applying labeling to the outer periphery of a moving object in a manner which is economical, effective and repeatable.

While certain aspects of conventional technologies have been discussed to facilitate disclosure of the invention, Applicants in no way disclaim these technical aspects, and it is contemplated that the claimed invention may encompass or include one or more of the conventional technical aspects discussed herein.

SUMMARY

According to certain aspects, the present invention provides new arrangements, apparatus and techniques useful for applying labeling to the outer periphery of a moving object in a manner which is cost-effective, reliable and repeatable. For example, according to the present invention a label is dispensed and applied to a surface of an object, a second member extends, applying pressure to one side of the object. A third member then extends, wrapping the label around the object, thus creating a near perfect wrap from the beginning of the label to the end of the label.

According to one aspect, the present invention provides an arrangement for the application of a label to the outer periphery of a moving object, the arrangement including: an initial label dispensing and application station, the station constructed and arranged to dispense a label and apply a first portion of the label to the peripheral surface of the moving object; a label tacking station, the label tacking station constructed and arranged to cause a second portion of the label to become adhered to an additional portion of the peripheral surface of the moving object; and a label wrapping station, the label wrapping station constructed and arranged to cause a third portion of the label to become adhered to an additional portion of the peripheral surface of the moving object.

According to another aspect, the present invention provides a method for applying a label to the outer peripheral surface of the moving object, the method comprising: dispensing a label; applying a first portion of a label to the peripheral surface of the moving object at a first station; applying a second portion of the label to an additional portion of the peripheral surface of the moving object a second station; and applying a third portion of the label to an additional portion of the peripheral surface of the moving object at a third station.

According to yet another aspect, the present invention provides an apparatus for adhering a label to an outer periphery of a moving object, the apparatus comprising: a wrapping block constructed and arranged to be moveable from a first position spaced and clear from the moving object, to a second position where the label is made to contact a surface on the periphery of the moving object, the wrapping block further constructed and arranged to be pivoted about at least a portion of the periphery of the moving object while in contact therewith.

The present invention may address one or more of the problems and deficiencies of the prior art discussed above. However, it is contemplated that the invention may prove useful in addressing other problems and deficiencies, or provide benefits and advantages, in a number of technical areas. Therefore the claimed invention should not necessarily be construed as being limited to addressing any of the particular problems or deficiencies discussed herein.

BRIEF DESCRIPTION OF THE DRAWINGS

These and other feature of this invention will now be described with reference to the drawings of certain embodiments which are intended to illustrate and not to limit the invention.

DETAILED DESCRIPTION

Further aspects, features and advantages of this invention will become apparent from the detailed description which follows.

Figure 1:
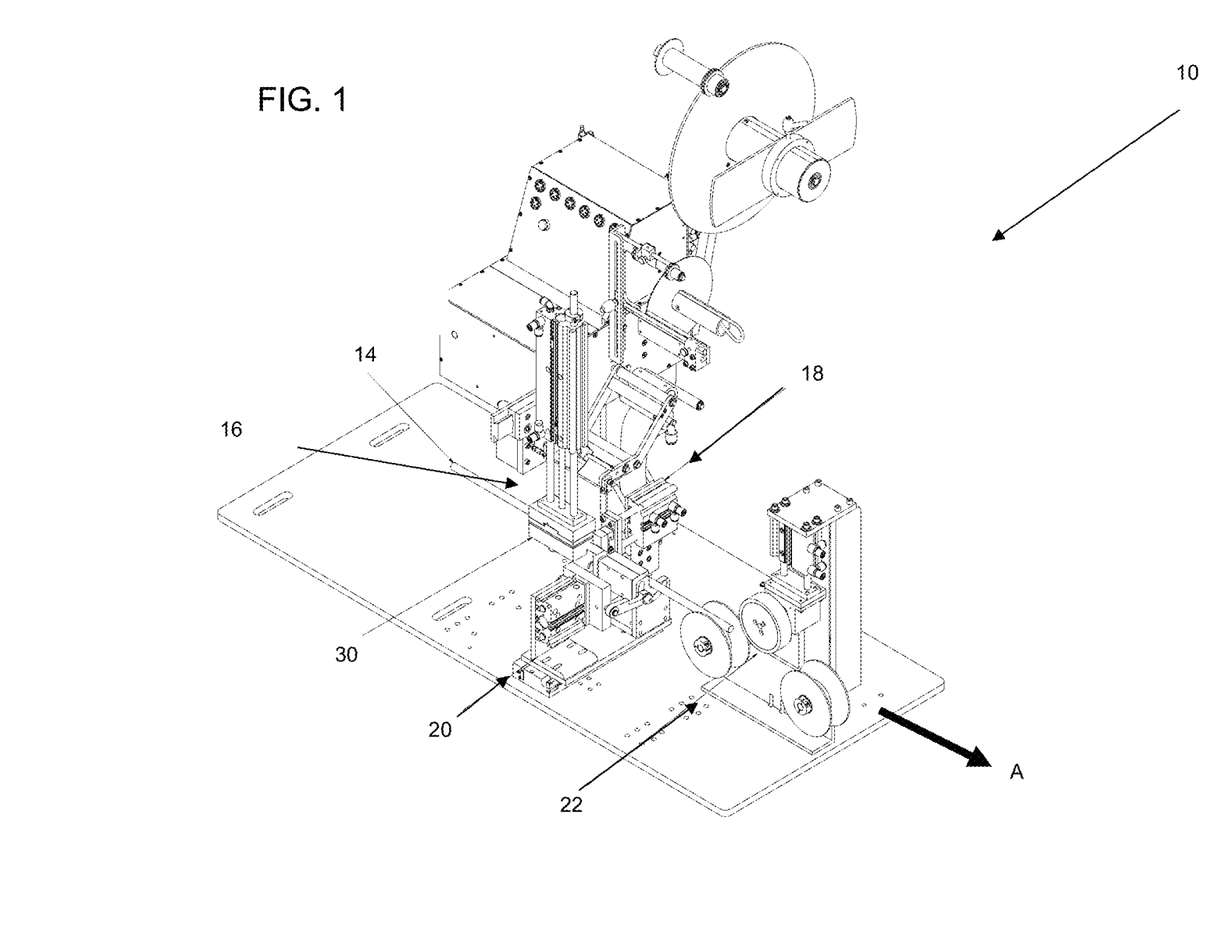
FIG. 1 shows a plan view of an arrangement constructed according to certain aspects of the present invention.
Figure 2:
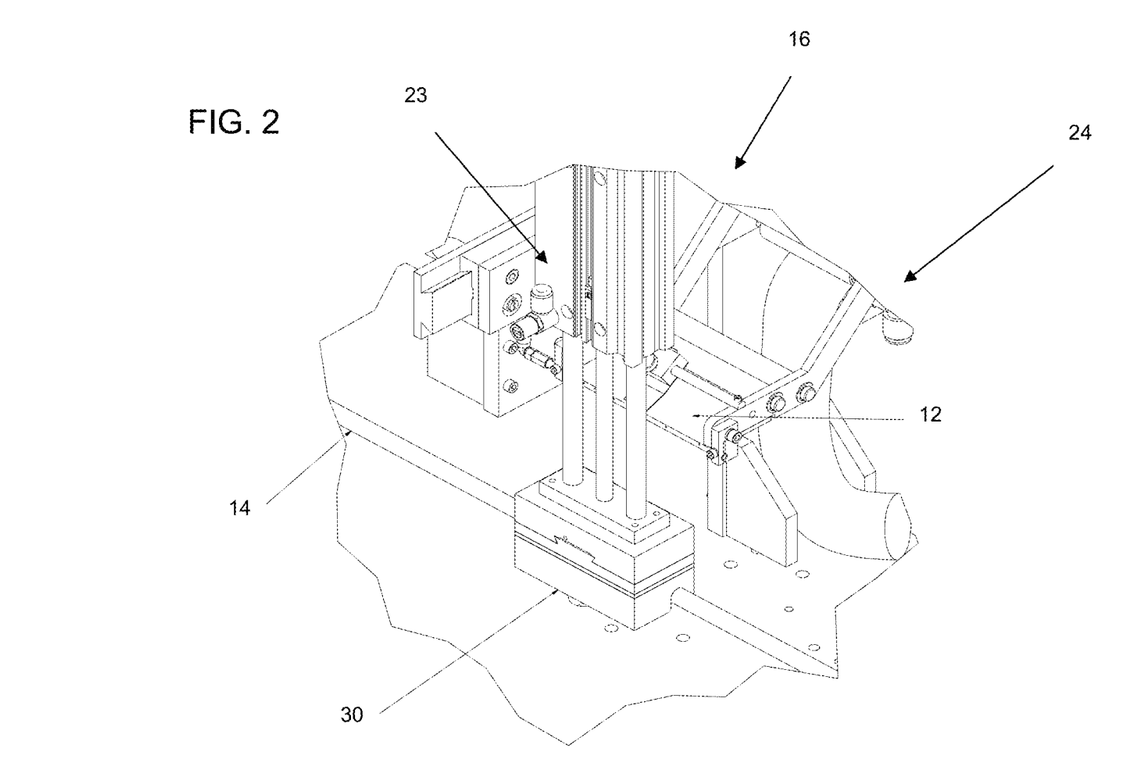
FIG. 2 is an enlarged view of a portion of the arrangement of FIG. 1.
Figure 3:
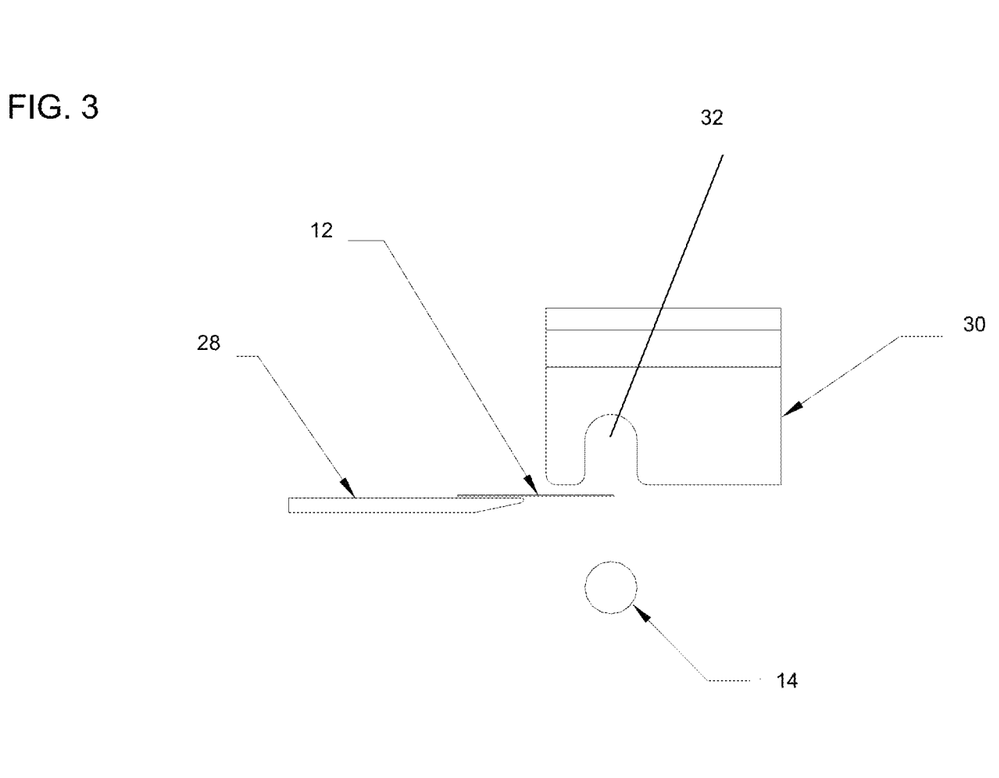
FIG. 3 is a side view of certain components of the portion of the arrangement of FIG. 2.

FIG. 1 illustrates an exemplary arrangement 10 constructed and arranged according to certain illustrative aspects of the present invention. The arrangement 10 is constructed so as to apply a label 12 (see, e.g. FIG. 2) to a moving object 14 along the outer periphery 15 thereof. The label 12 can be constructed from any suitable material. For example, the label can be fabricated from paper, polymer, metal, foil or combinations thereof. The label 12 may comprise an adhesive, such as a pressure-sensitive adhesive, which facilitates attachment to the outer periphery 15 of the moving object 14. Suitable adhesives can vary and depend largely on the nature of the object to which the label is adhered. Choice of a suitable adhesive is within the capabilities of those of ordinary skill in the art. Of course, the labels may be adhered to the outer periphery 15 of the moving object 14 by other suitable mechanisms, such as shrink wrapping, heat-shrinking, and the like. The label 12 can be provided with any suitable form of indicia. Suitable forms of indicia include colors, color-coding, alphanumeric characters, optically readable codes (e.g., barcodes and the like), and combinations thereof. The indicia may be pre-printed onto the label 12, or indicia may be applied subsequent to the application of the label to the outer peripheral surface 15 of the moving object 14.

The object 14 can be formed from any suitable material, and can take any suitable form. Suitable materials include metals, plastics, polymers, glasses, composites, and combinations thereof. Thus, for example, the object 14 can be solid or hollow with respect to its cross-section. The object 14 can have any suitable cross-sectional configuration. In the illustrated embodiment, the object 14 has a round cross-section. However, the invention is not so limited. Instead, the cross-section can have any regular or irregular shape whatsoever. For example, the object 14 can have a rounded, oval, or polygon will cross-sectional configuration. Other irregular shapes are also contemplated. According to certain optional aspects of the present invention, the object 14 can comprise a cable or conduit. For example, certain electrical wiring is made such that it is housed within an outer protective conduit. Such products are often labeled along the outer periphery of the conduit such that information can be provided concerning the nature of the wiring housed within the conduit. The arrangement 10 of the present invention, and associated methods, can optionally be used to apply a label along the outer periphery of the object 14, while the object 14 is moving. The direction of movement can vary according to the present invention. According to the illustrated embodiments, the object 14 is moving in a generally longitudinal direction in the direction indicated by arrow A. The movement can optionally be continuous, that is, movement is not intentionally stopped during application of one or more labels 12 to the outer peripheral surface 15 of the object 14. Alternatively, movement of the object 14 may be interrupted, at least temporarily, either before, during, or after application of a label 12 along the outer peripheral surface 15 thereof. Movement of the object 14 can be effected according to any conventional mechanism or apparatus. Thus, devices such as guide rollers, winding reels, and the like can be used to effect movement of the object 14 in the desired manner. Such components are not central to an understanding of the present invention, and thus are not illustrated in FIG. 1.

The arrangement 10 of the present invention may be implemented in a larger overall manufacturing environment in a suitable manner. Thus, for example, the arrangement 10 can be implemented in-line with the manufacturing process of the object 14. Alternatively, the object 14 may be manufactured in a different line, and transferred for further processing by the arrangement 10 of the present invention.

As illustrated in FIG. 1, the arrangement 10 has a number of components. According to the illustrated embodiment, the arrangement 10 includes an initial label dispensing an application station 16, a label tacking station 18, and a label wrapping station 20.

The arrangement 10 may further include an optional encoded indexing station 22. The indexing station 22 has a sensor, such as an encoder wheel, capable of detecting the speed of the movement of the object 14, and provides the arrangement 10 with certain information based thereon. Thus, a signal produced by the indexing station 22 commensurate with the speed of travel of the object 14 can be used to control the frequency of the operation of the components of the arrangement 10 so as to control the frequency of the application of the labels to the outer periphery 15 of the object 14. For example, a programmable logic controller or PLC can determine precisely the spacing along the cable for which the label to be applied. This is programmed into the PLC by first determining the diameter of the encoder metering wheel. Then by interpolating this into linear feet, the operator can type in the desired spacing between each label. By doing this type of encoder measuring the speed of the cable can be continuously changing without affecting the spacing in between.

According to certain alternative embodiments, the label tacking station 18 can be located downstream from the initial label dispensing an application station 16, with respect to the direction of movement of the object 14. According to a further alternative embodiment, the label wrapping station 20 can further be provided downstream from the label tacking station 18, again relative to the direction of movement of the object 14.

The operation of the above-mentioned stations will now be described in greater detail. Each of these stations are provided with suitable actuation mechanisms. Any suitable actuation mechanism, or combination of mechanisms, is contemplated by the present invention. Thus, suitable actuation mechanisms contemplated include mechanical, electrical, electromechanical, piezoelectric, magnetic, electromagnetic, hydraulic, pneumatic, and combinations thereof. According to one illustrative embodiment, actuation of the various components of the arrangement 10 can be affected by air pressure driven members or actuators (e.g., 23).

As perhaps best illustrated in FIGS. 2-8, the initial label dispensing and application station 16 may include a label dispensing component 24. Of course, it is contemplated that more than one label dispensing component 24 can be incorporated into the arrangement 10 according to the principles of the present invention. It is contemplated that multiple label dispensing components 24 could be utilized to apply different forms of labeling to the object 14. Alternatively, a single label dispensing component 24 could provide different forms of labeling. Thus, for example, multiple streams or rolls of labels could be fed by the label dispensing component 24. According to another example, the labels could be provided on a single supply, but different kind of labels staggered sequentially thereon. It is contemplated by the present invention that to device capable of selecting from amongst different types of labeling 12 provided sequentially in a feed source.

The initial label dispensing an application station 16 may further include a label applicator component 28 (see, e.g. FIG. 3), for transporting a label 12 from the dispenser to a separate component for applying the label to the peripheral surface 15 of the object 14. Any suitable component is contemplated. According to the illustrated embodiment, this component is in the form of a plate, sometimes referred to as a stripper plate, for peeling the label to present it at a location where it is accessible by a separate component which then can apply it to the object 14. This component 28 can be formed from any suitable material, as is the case with all the components described herein. These components, in each and every instance, can be formed from any suitable material or combination of materials, such as metals, ceramics, polymers, glasses, composites, and/or combinations thereof.

Figure 4:
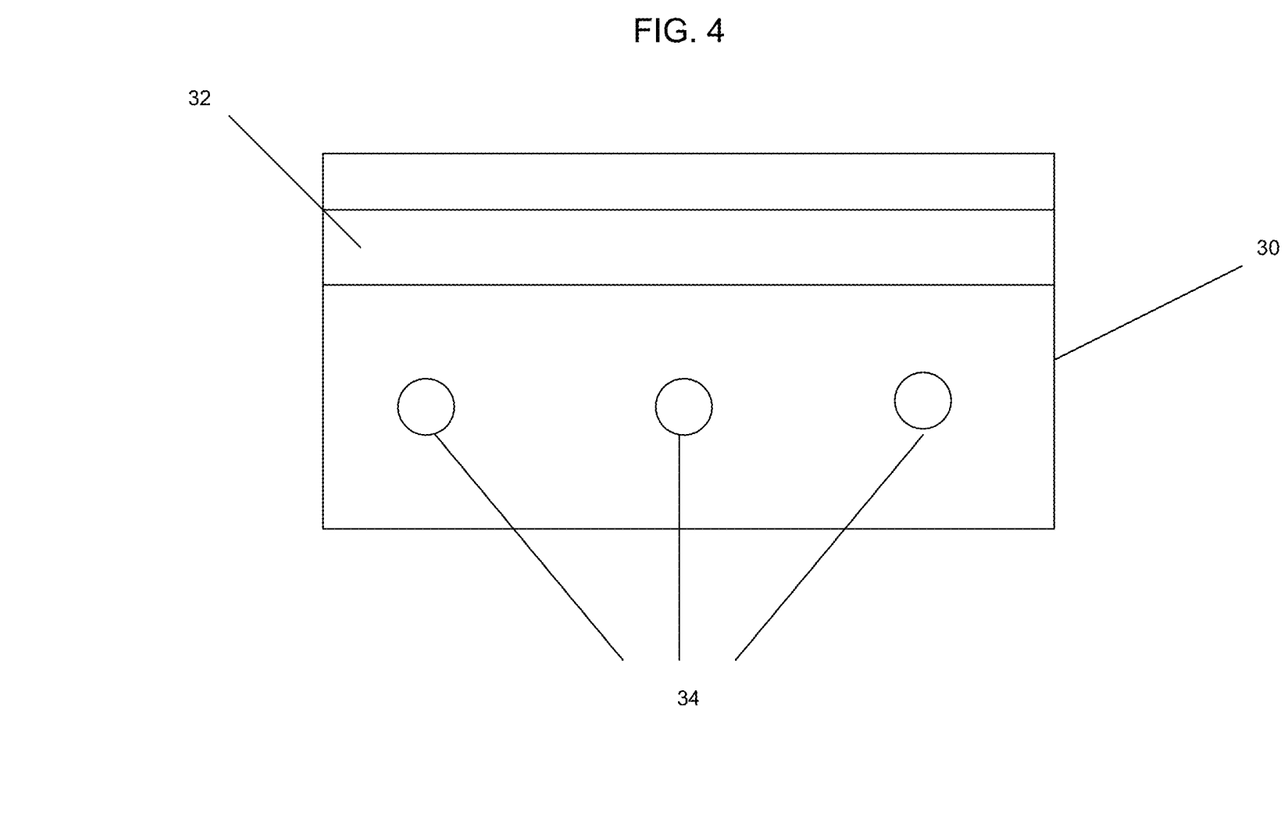
FIG. 4 is a bottom view of one of the components of FIG. 3.

The object capable of applying the label can also take any suitable form. According to the illustrated embodiment, the initial label dispensing and application station 16 further includes a tamp head 30 formed from any suitable material. As illustrated, for example, in FIG. 3, the tamp head 30 is provided with a recess 32 which has a shape and configuration such that it conforms to at least a portion of the outer periphery 15 of the object 14. The tamp head 30 may optionally be provided with structure which facilitates transport of a label 12 to the outer periphery 15 of the object 14. Any suitable structure is contemplated. According to the illustrated embodiment, as shown in FIG. 4, the tamp head 30 can be provided with ports 34 through which suction or vacuum pressure is applied to a surface of the label in communication therewith. Other suitable mechanisms could include mildly adhesive pads, electrostatic measures, etc. The arrangement 10 and associated methods of the present invention can be adapted and applied to objects of different sizes shapes and configurations by replacing or exchanging tamp heads having a groove or recess specifically shaped and configured for a particular form of object. The tamp heads 30 can also be replaced if worn to a degree which renders them unsuitable for further use.

Figure 5:
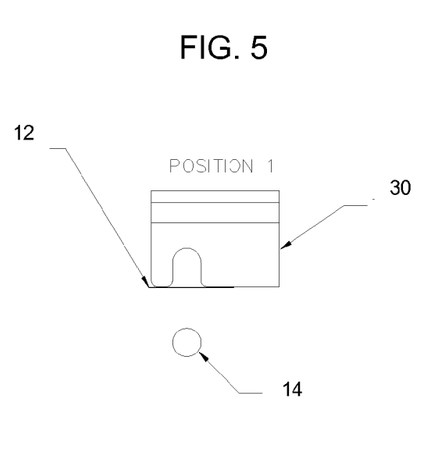
FIG. 5 is a schematic illustration of the functionality of the components illustrated in FIG. 3 of the present invention at a first position.
Figure 6:
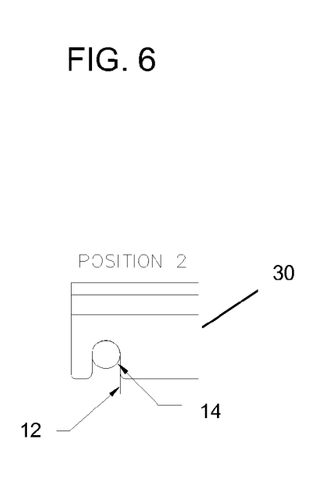
FIG. 6 is a schematic illustration of the functionality of the components illustrated in FIG. 3 of the present invention at a second position.
Figure 7:
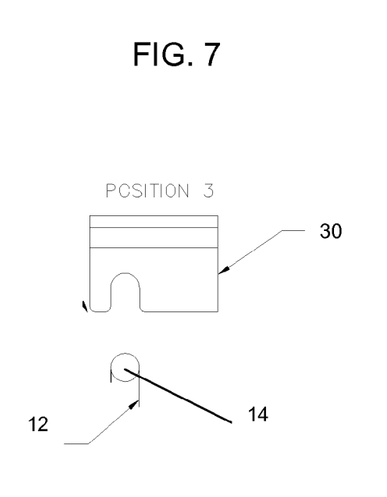
FIG. 7 is a schematic illustration of the functionality of the components illustrated in FIG. 3 of the present invention at a third position.
Figure 8:
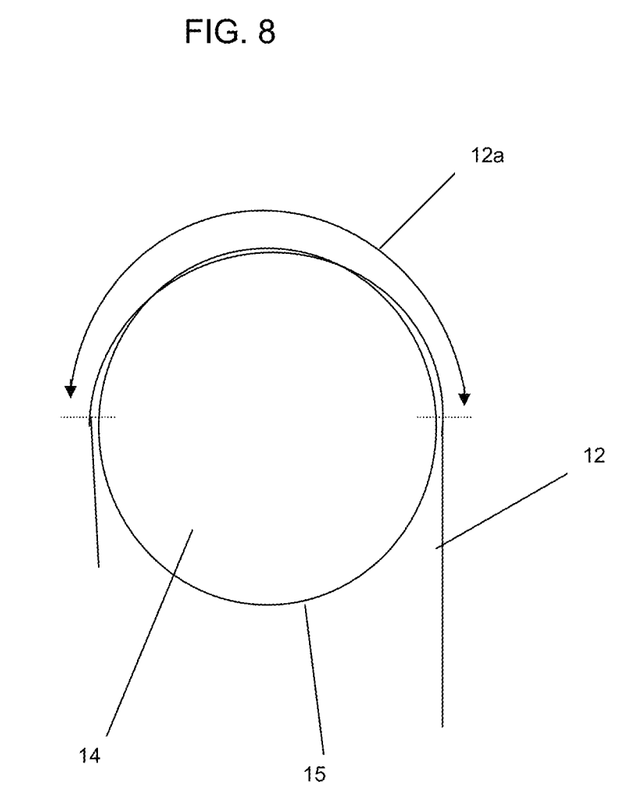
FIG. 8 is a schematic illustration of the positioning of a label along the outer periphery of an object upon the conclusion of the functionality according to the third position as illustrated in FIG. 7.

According to certain aspects of the present invention, an exemplary operation of the initial label dispensing application station is depicted in FIGS. 5-7. As illustrated therein, a label has been sent to, and is held by, the tamp head 30. The tamp head 30 is movable by the actuator 23 from a first position wherein the label is spaced and clear from the object 14 (FIG. 5), to a second position wherein at least a portion of the label 12 is made to contact at least a portion of the peripheral surface 15 of the object 14 (FIG. 6). Once the label 12 has been applied to the object 14, the tamp head 30 is then retracted to a third position which is also free and clear from the object 14 (FIG. 7).

As a result of the operations performed by the initial label dispensing an application station 16, at least a first portion of label 12 is applied to at least a first portion of the peripheral surface 15 of the object 14. This first portion of both the label 12 and the peripheral surface 15 is illustrated at 12*a* in FIG. 8. According to the illustrated embodiment, approximately half of the peripheral surface 15 of the object 14 has the label 12 applied thereto. However, the present invention is not so limited. As a result of the operation of the above described station, the first portion 12*a* can be greater or less than the illustrated amount still be comprehended within the principles of the present invention.

Figure 9:
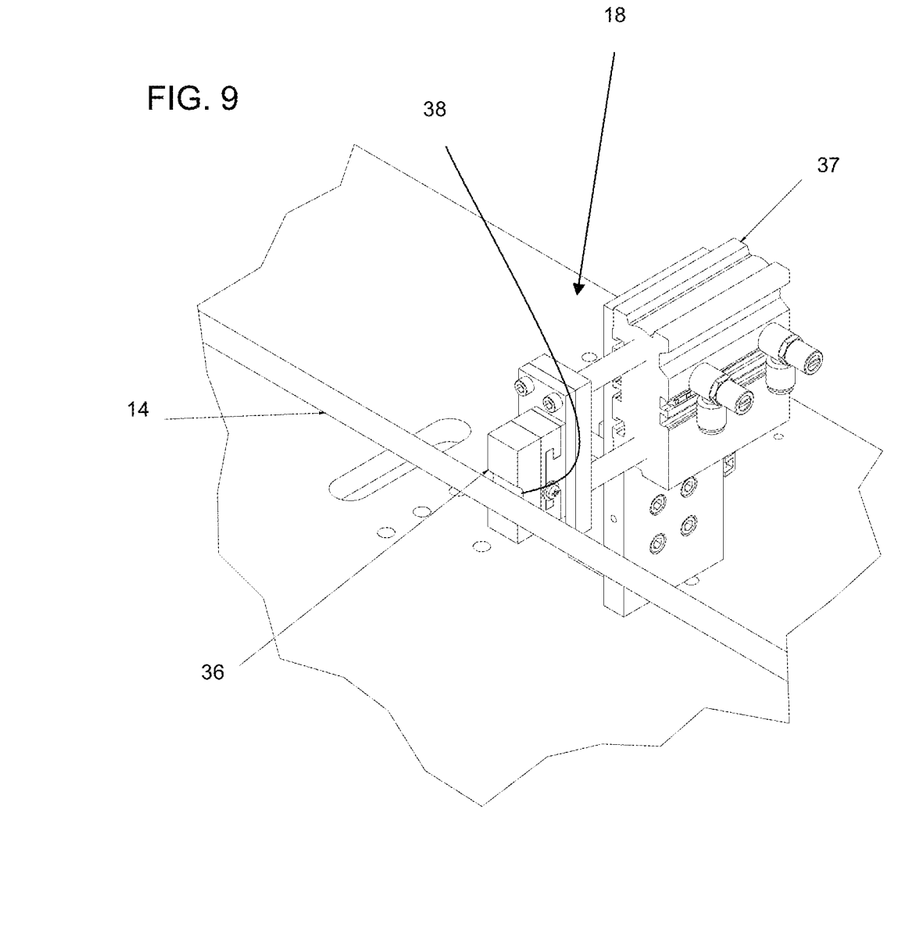
FIG. 9 is an enlarged view of additional components of the arrangement of FIG. 1.

According to the illustrated embodiment, the label tacking station 18 can include a block head 36 formed from any suitable material. The block head 36 is movable by any suitable actuator 37, as previously described. The block head 36 also comprises a recess 38 shaped and configured to conform to at least a portion of the outer periphery 15 of the object 14. Thus, the block head 36 is also interchangeable in the same manner described above in connection with the tamp head 30.

Figure 10:
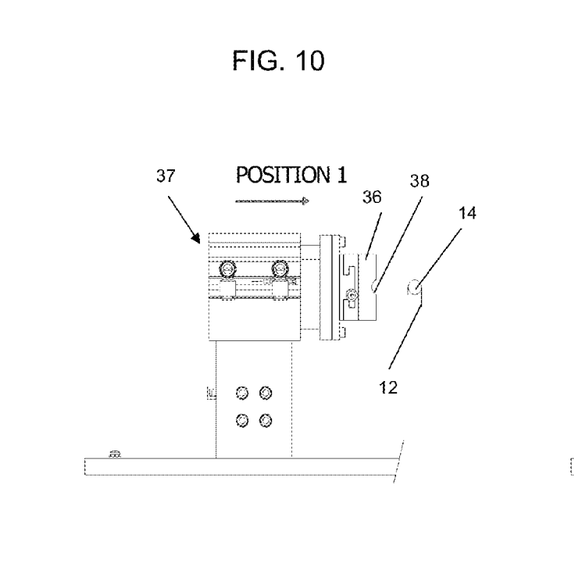
FIG. 10 is a schematic illustration of the functionality of the components illustrated in FIG. 9, at a first position.
Figure 11:
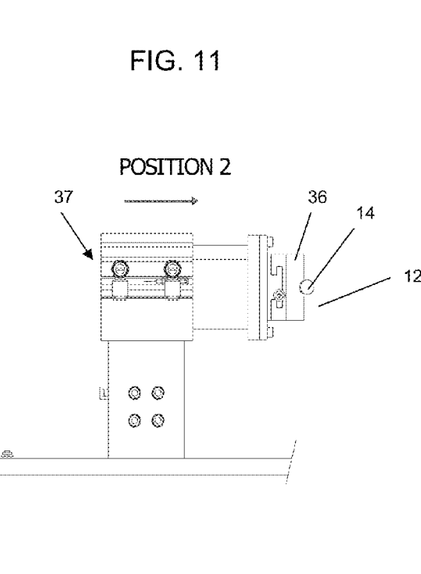
FIG. 11 is a schematic illustration of the functionality of the components illustrated in FIG. 9, at a second position.
Figure 12:
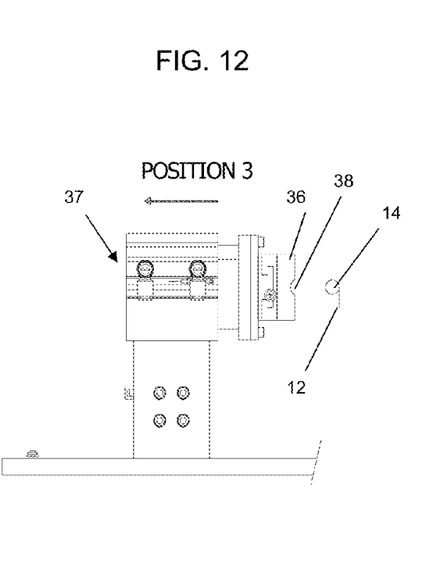
FIG. 12 is a schematic illustration of the functionality of the components illustrated in FIG. 9, at a third position.
Figure 13:
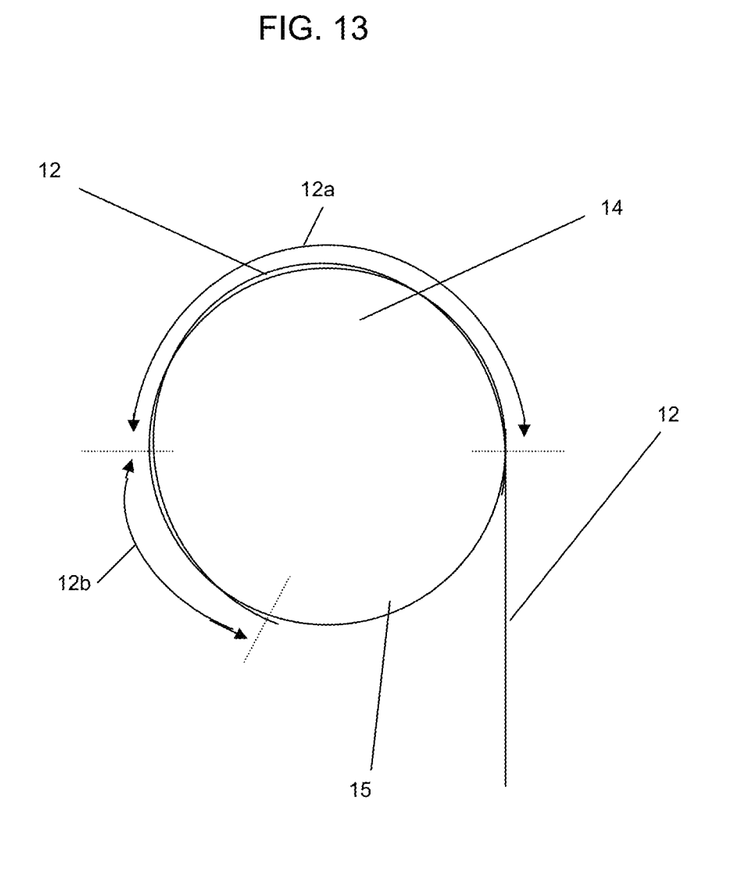
FIG. 13 is a schematic illustration of the positioning of a label along the outer periphery of an object upon the conclusion of functionality according to the third position, as illustrated in FIG. 12.

According to certain embodiments, the label tacking station 18 can be constructed and arranged to operate in accordance with the manner depicted schematically in FIGS. 10-12. As illustrated therein, the block head 36 is constructed and arranged such that it can be located at a first position which is free and clear of the object 14, which may be moving (FIG. 10). When utilized in accordance with certain alternative embodiments of the present invention, such that the label tacking station is located downstream relative to the initial label dispensing an application station 16, the label 12 will have will have already been applied to the object 14, in a manner along the lines of that described previously. This scenario is depicted in FIGS. 10-12. The block head 36, having a recess 38, and then be moved by a suitable actuator 37 to a second position wherein a second portion of the label is made to contact a second portion of the peripheral surface of the moving object (FIG. 11). The block head 36 can then be repositioned to a third position wherein the object 14, and label 12 associated there with, is again free and clear (FIG. 12). As a result of this illustrative functionality of the label tacking station 18, the label 12 is now adhered to a greater portion of the peripheral surface 15 of the object 14, relative to when the object 14 and label 12 left the initial label dispensing an application station 16. This is illustrated in FIG. 13. According to the illustrated embodiment, as a result of the above described functionality of the label tacking station 18, an additional second portion of the label has been adhered to an additional second portion of the peripheral surface 15 of the object 14. The second portion of both of the label 12 and peripheral surface 15 is illustrated as 12*b* in FIG. 13. In the illustrative example, this portion 12*b* is illustrated as being perhaps slightly less than one quarter of the overall peripheral surface 15 of the object 14. This is of course simply for purposes of illustration, and the label tacking station may adhere more or less than the illustrated amount of the label 12 to the peripheral surface 15 of the object.

Figure 14:
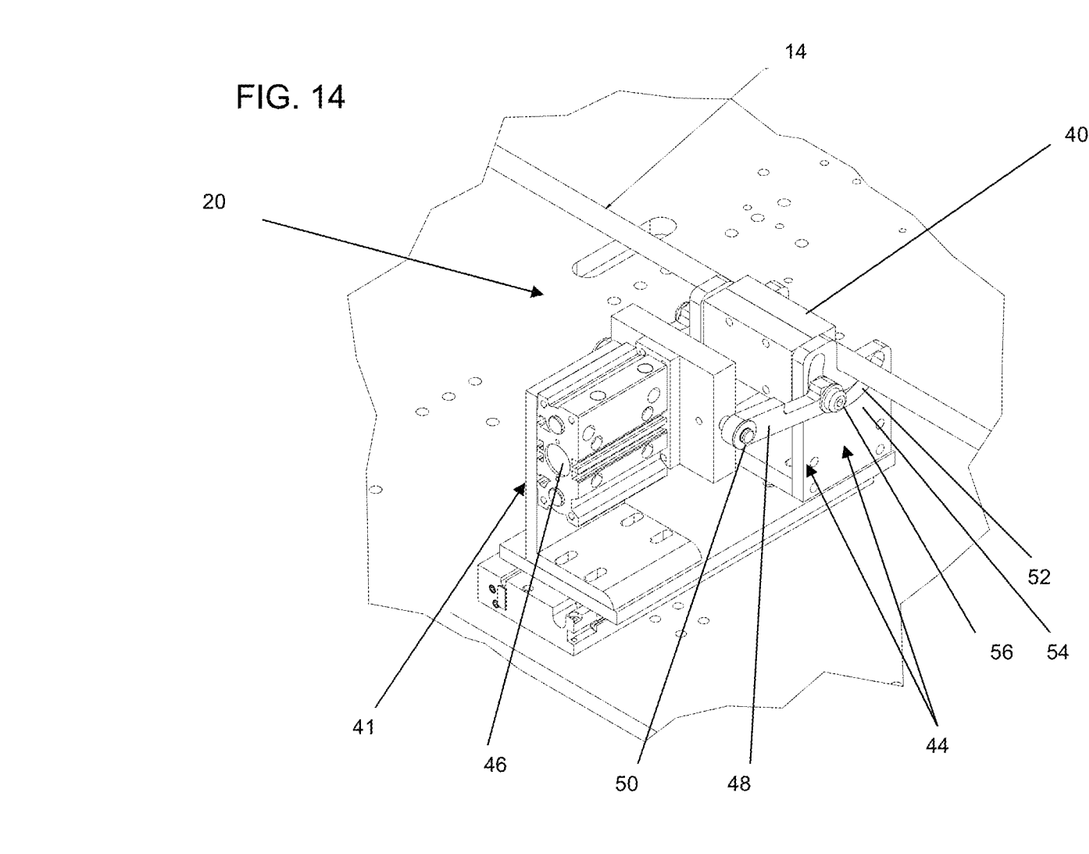
FIG. 14 is an enlarged view of further components of the arrangement of FIG. 1, according to additional aspects of the present invention.

The label wrapping station 20, can have any suitable configuration, and be formed by a number of different components. According to the illustrative embodiment, the label wrapping station 20 can be provided with a wrapping block 40 formed from any suitable material, as previously explained herein. The wrapping block 40 can be moved and positioned by a suitable actuator 41, having any of the features previously described herein with respect to the other actuators of the different stations. The wrapping block 40 is also provided with a recess 42 shaped and configured so as to conform to at least a portion of the peripheral surface 15 of the object 14. Thus, as with the other blocks and heads of the different stations, the wrapping block 40 can be exchanged with different style blocks so as to apply the arrangement and techniques of the present invention 2 different forms shapes and sizes of objects 14. The wrapping block 40 can also be provided with a construction which permits the wrapping block 40 to pivot about the outer peripheral surface 15 of the object 14 in order to facilitate adherence of the label 12 thereto. Any suitable mechanism familiar to those skilled in the art can be provided in order to effect this pivoting action. According to the illustrated embodiment, a pivoting cam-follower in a track is provided and identified generally as element 44 (see, e.g. FIG. 14).

Figure 15:
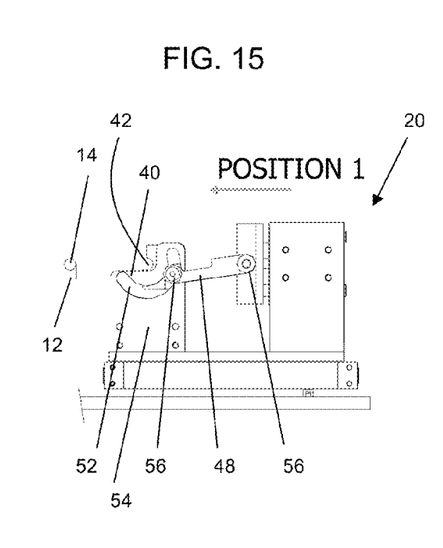
FIG. 15 is a schematic illustration of the functionality of the components illustrated in FIG. 14, at a first position.
Figure 16:
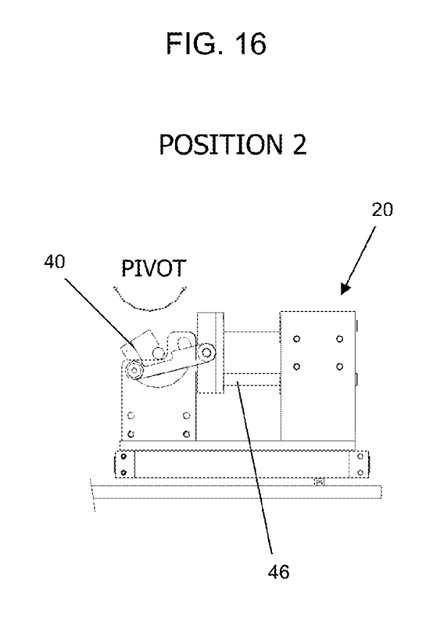
FIG. 16 Is a schematic illustration of the functionality of the components illustrated in FIG. 14, at a second position.
Figure 17:
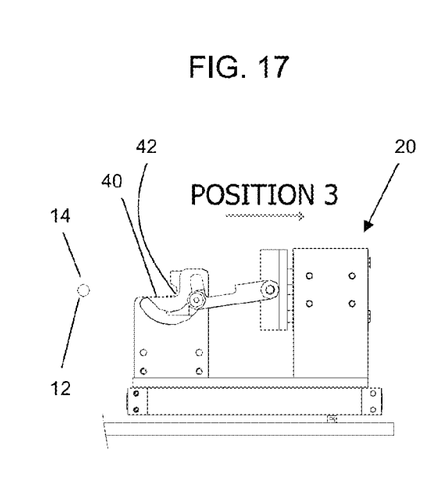
FIG. 17 is a schematic illustration of the functionality of components Illustrated in FIG. 14, at a third position.
Figure 18:
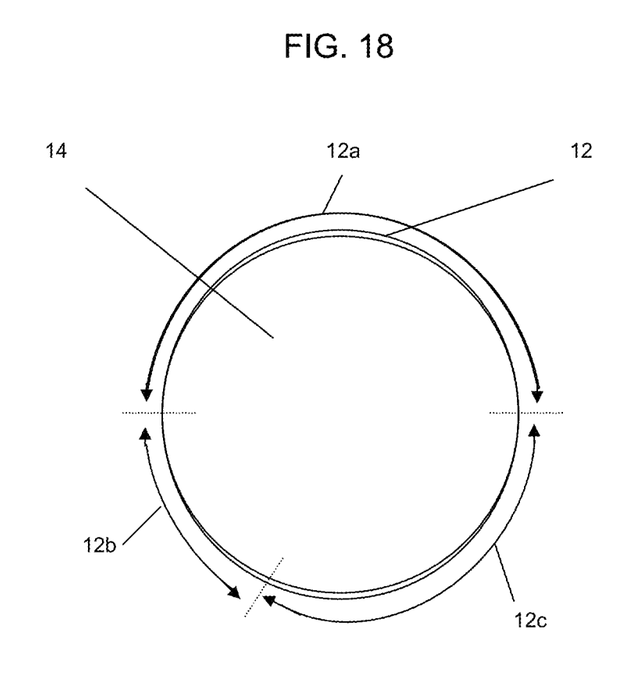
FIG. 18 is a schematic illustration of the positioning of a label along the outer periphery of an object upon the conclusion of the functionality according to the third position, as illustrated in FIG. 17.

According to certain embodiments, the label wrapping station 20 can be constructed and arranged to operate in accordance with the manner depicted schematically in FIGS. 15-17. As illustrated therein, the wrapping block 40 is constructed and arranged such that it can be located at a first position which is free and clear of the object 14, which may be moving (FIG. 15). When utilized in accordance with certain alternative embodiments of the present invention, such that the label wrapping station 20 is located downstream relative to the label tacking station 18, the label 12 will have will have already been applied to at least part of the peripheral surface 15 of the object 14 (e.g., parts 12a and 12b) as previously described herein. This scenario is depicted in FIGS. 15-17. The wrapping block 40, having a recess 42, and then be moved by a suitable actuator 41 to a second position wherein the recess 42 conforms to the periphery 15, and pivoted by the actuator and pivoting cam structure 44 such that a third portion of the label 12 is adhered to a third portion of the object 14 (FIG. 16). The wrapping block 40 can then be repositioned to a third position wherein the object 14, and label 12 associated therewith, is again free and clear of the object 14 (FIG. 17). As a result of this illustrative functionality of the label tacking station 18, the label 12 is now adhered to a greater portion of the peripheral surface 15 of the object 14, relative to when the object 14 and label 12 left the initial label dispensing an application station 16. This is illustrated in FIG. 18. According to the illustrated embodiment, as a result of the above described functionality of the label wrapping station 20, an additional third portion of the label has been adhered to an additional third portion of the peripheral surface 15 of the object 14. The third portion of both of the label 12 and peripheral surface 15 is illustrated as 12c in FIG. 18. In the illustrative example, this portion 12c is illustrated as being perhaps slightly greater than one quarter of the overall peripheral surface 15 of the object 14. This is of course simply for purposes of illustration, and the label wrapping station may adhere more or less than the illustrated amount of the label 12 to the peripheral surface 15 of the object, which is specifically contemplated by the present invention.

According to additional optional embodiments of the present invention, the wrapping station 20 can have a number of optional features, which are illustrated in FIGS. 14-17. The wrapping station can include one or more of the features described below, or any combination thereof. In addition, it should be understood that the wrapping station 20 may have separate utility apart from the arrangement previously described herein. Thus, for example, the actuator 41 can comprise a linear actuator having a linear ram or piston 46. The actuator 41 may be connected to a first end of a pivotable arm 48. The connection can be made by any suitable means. Thus, for example, the connection can be mechanically made with the pin 50. The pin 50 allows relative movement or rotation between the pivotable arm 48 and the connection with the actuator 41. A second or opposite end of the pivotable arm 48 is constructed and arranged to travel within arcuate track 52 provided in a stationary frame member 54. The wrapping block 40 resides within the relatively stationary frame 54. Again, the connection between the second end of the pivotable arm 48 and the wrapping block 40 can be made by any suitable means. According to the illustrated example, the connection is made by another pin 56. The pin 56 allows relative movement between the pivotable arm 48 and the wrapping block 40. This illustrative construction allows for a linear actuator, yet produces an arcuate or pivotable motion of the wrapping block about the periphery of the moving object 14. This action causes the label to adhere to at least a portion of the outer periphery of the moving object 14.

According to one embodiment, as a result of the operation of the label wrapping station 20, the entire surface area of the label 12 is adhered to the periphery 15 of the object 14. It is of course contemplated that, in the event that the surface area of the periphery is smaller than the surface area of the label, the label may be caused to overlap itself when applied according to the arrangement 10 of the present invention, as described in the optional embodiments set forth above. It is also contemplated that the periphery be larger than the surface area of the label 12, such that the ends of the label do not meet when fully disposed on the periphery 15 of the object 14. It is further contemplated that one or more edges of the label may not be fully adhered to either of the periphery 15, or another surface of the label 12.

The present invention is also directed to methods or techniques for applying a label to a peripheral surface of an object, such as a moving object. According to optional embodiments, the object may be a moving cable or conduit. As previously set forth herein, the object can be formed from any suitable material, and take any number of alternative cross-sectional and/or longitudinal configurations. Similarly, the label can be formed from any suitable material, and can be provided with any suitable form of indicia, which is either preprinted thereon, or provided at a later point in time.

Thus, according to one illustrative embodiment of the present invention, a method for applying a label to the outer peripheral surface of the moving object is provided which includes: dispensing the label, applying a first portion of the label to a first portion of the peripheral surface of a moving object at a first station; applying a second portion of the label to an additional second portion of the peripheral surface of the moving object at a second station; and applying a third portion of the label to an additional third portion of the peripheral surface of a moving object at a third station.

According to certain optional aspects of the above described method or technique, the second station may optionally be provided downstream from the first station, in the direction relative to the movement of the object. According to a further alternative, the third station may also be provided downstream with respect to the second station. According to a further optional embodiment, the steps described above in connection with the general technique of the present invention can be repeated a plurality of times thus applying a number of different labels to the moving object. The object can be moved according to this technique by any suitable mechanism familiar to those skilled in the art. Any suitable rate of movement can also be utilized according to the technique or methods of the present invention, as well as the arrangement 10 previously described herein. Thus, a suitable rate of movement of the object can be, for purposes of example only, on the order of 20-50 ft./min.

The method generally described above may also further optionally include moving the label from a first position spaced and clear from the moving object to a second position wherein the first portion of the label is made to contact the first portion of the peripheral surface of the moving object. The method generally described above may also include, according to an alternative embodiment, moving the label from a first position spaced and clear from moving object to a second position, or the second portion of the label is made to contact the second portion of the peripheral surface of the moving object. The method generally described above may additionally include, according to certain alternative embodiments, moving the label from a first position spaced and clear from the moving object to a second position for at least a portion of labile was made to contact the periphery of the moving object, then providing an optional pivoting to cause an additional portion of the label to adhere to an additional portion of the periphery of the moving object. According to these optional embodiments, at the conclusion of the performance of the steps, the label may be optionally adhered to the entire periphery off the object. Alternatively, when the periphery is larger than the surface area of the label, the entire label could be adhered to the periphery, but the edges of the label may be spaced apart. On the other hand, when the surface area of the label is greater than the periphery of the object, the ends of the label may be caused to overlap. According to a further alternative, one or more edges of the label are intentionally left unsecured.

Any numbers expressing quantities of ingredients, constituents, reaction conditions, and so forth used in the specification are to be understood as being modified in all instances by the term "about". Notwithstanding that the numeric ranges and parameters setting forth, the broad scope of the subject matter presented herein are approximations, the numerical values set forth are indicated as precisely as possible. Any numerical value, however, may inherently contain certain errors or inaccuracies as evident from the standard deviation found in their respective measurement techniques. None of the features recited herein should be interpreted as invoking 35 U.S.C. §112, ¶6, unless the term "means" is explicitly used.

Although the present invention has been described in connection with preferred embodiments thereof, it will be appreciated by those skilled in the art that additions, deletions, modifications, and substitutions not specifically described may be made without departing from the spirit and scope of the invention.

We claim:

1. A system for the application of a label to the outer periphery of a moving object, the system comprising:
an initial label dispensing and application station, said station constructed and arranged to dispense a label and apply a first portion of the label to the peripheral surface of the moving object;
a label tacking station, the label tacking station constructed and arranged to cause a second portion of the label to become adhered to an additional portion of the peripheral surface of the moving object; and
a label wrapping station, the label wrapping station constructed and arranged to cause a third portion of the label to become adhered to a further additional portion of the peripheral surface of the moving object; wherein the wrapping station comprises a wrapping block constructed and arranged to be pivoted about at least a portion of the outer periphery of the moving object by a cam follower in a track, and wherein the label tacking station is downstream from the initial label dispensing and application station, and the label wrapping station is downstream from the label tacking station.

2. The system of claim 1, wherein the initial label dispensing and application station comprises a label dispensing component, and a label applicator component, wherein the label dispensing component and the label applicator components are separate components.

3. The system of claim 2, wherein the label dispensing component contains a plurality of labels for dispensing.

4. The system of claim 3, wherein the labels comprise a pressure sensitive adhesive.

5. The system of claim 3, wherein the label dispensing component further comprises a member for transporting an individual label to a location that makes it accessible to the label applicator component.

6. The system of claim 2, wherein the label applicator component comprises a tamp head constructed and arranged to be movable from a first position spaced and clear from the moving object, and second position where the first portion of the label is made to contact a first portion of the peripheral surface of the moving object.

7. The system of claim 6, wherein the tamp head is constructed and arranged to hold the label to a surface thereof.

8. The system of claim 7, wherein the tamp head is constructed and arranged to hold the label to the surface thereof by applying suction to the label.

9. The system of claim 6, wherein the tamp head comprises a recess having a shape and configuration such that it conforms with at least part of the first portion of the outer periphery of the moving object.

10. The system of claim 1, wherein the label tacking station comprises a block head constructed and arranged to be moveable from a first position spaced and clear from the moving object, to a second position where the second portion of the label is made to contact a second portion of the peripheral surface of the moving object.

11. The system of claim 10, wherein the block head comprises a recess having a shape and configuration such that it conforms with at least a part of the second portion of the outer periphery.

12. The system of claim 1, wherein the label wrapping station comprises a label wrapping block constructed and arranged to be moveable from a first position spaced and clear from the moving object, to a second position where the third portion of the label is made to contact a third portion of the peripheral surface of the moving object.

13. The system of claim 12, wherein the wrapping block comprises a recess having a shape and configuration such that it conforms with at least part of the third portion of the outer periphery of the moving object.

14. The system of claim 1, wherein the moving object is a moving cable.

15. The system of claim 1, wherein the outer periphery of the moving object is substantially circular.

16. The system of claim 1, further comprising a linear actuator and a pivotable arm, one end of the pivotable arm operatively connected to the linear actuator, and the other end of the pivotable arm connected to the wrapping block.

17. The system of claim 16, further comprising a relatively stationary frame, the frame comprising an arcuate track, the other end of the pivotable arm constructed and arranged for guided movement within the arcuate track so that the linear actuation is translated into an arcuate pivoting motion by the wrapping block.

* * * * *

UNITED STATES PATENT AND TRADEMARK OFFICE
CERTIFICATE OF CORRECTION

PATENT NO. : 8,708,018 B2  
APPLICATION NO. : 13/461529  
DATED : April 29, 2014  
INVENTOR(S) : Andrew E. Boulay et al.

Page 1 of 1

It is certified that error appears in the above-identified patent and that said Letters Patent is hereby corrected as shown below:

Title Page, item 73 (Assignee): Correct the Assignee name to state "Booth Manufacturing Company"

Signed and Sealed this  
Fifth Day of August, 2014

Michelle K. Lee  
*Deputy Director of the United States Patent and Trademark Office*